US012647351B2

(12) United States Patent
Labonté

(10) Patent No.: US 12,647,351 B2
(45) Date of Patent: Jun. 2, 2026

(54) QUICK REROUTE IN CLOS NETWORKS

(71) Applicant: Arista Networks, Inc., Santa Clara, CA (US)

(72) Inventor: Francois Labonté, Menlo Park, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 79 days.

(21) Appl. No.: 18/897,910

(22) Filed: Sep. 26, 2024

(65) Prior Publication Data

US 2026/0089089 A1 Mar. 26, 2026

(51) Int. Cl.
H04L 45/24 (2022.01)
H04L 45/28 (2022.01)
H04L 45/42 (2022.01)

(52) U.S. Cl.
CPC .............. H04L 45/24 (2013.01); H04L 45/28 (2013.01); H04L 45/42 (2013.01)

(58) Field of Classification Search
CPC .......... H04L 45/24; H04L 45/28; H04L 45/42
USPC ........................................................ 709/238
See application file for complete search history.

(56) References Cited

U.S. PATENT DOCUMENTS 8,514,718 B2* 8/2013 Zijst ........................ H04L 47/15
370/312
8,861,340 B1* 10/2014 Atlas ........................ H04L 45/22
370/227

10,469,921 B2* 11/2019 Grammel ............. H04L 41/0654
2009/0187795 A1* 7/2009 Doverspike ............. H04L 45/12
714/43
2010/0290458 A1* 11/2010 Assarpour ............... H04L 45/00
370/389
2014/0078927 A1* 3/2014 Thubert .................. H04L 45/18
370/254

(Continued)

FOREIGN PATENT DOCUMENTS

EP 3573293 A1 11/2019
EP 3920484 A1 12/2021

OTHER PUBLICATIONS

European Patent Office, Extended European Search Report, EP Application No. 25203866.6, dated Jan. 27, 2026, 13 pgs.

(Continued)

*Primary Examiner* — Frantz B Jean
(74) *Attorney, Agent, or Firm* — Fountainhead Law Group, PC

(57) ABSTRACT

Techniques for implementing quick reroute in a Clos network comprising a plurality of leaf network devices and a plurality of spine network devices are provided. In one set of embodiments, a first spine network device can configure an Equal-Cost Multi-Path (ECMP) group that comprises the plurality of leaf network devices except for a first leaf network device. The first spine network device can further detect a connectivity failure between the first spine network device and the first leaf network device. In response to the failure, the first spine network device can update one or more routes in a routing table, where the one or more routes are associated with one or more hosts that are connected to the first leaf network device, and where updating each route in the one or more routes comprises changing the route to point to the ECMP group as a next hop.

20 Claims, 8 Drawing Sheets

(56) References Cited

U.S. PATENT DOCUMENTS

| 2014/0334286 | A1* | 11/2014 | Ernstrom | ............... | H04L 49/65 |
| | | | | | 370/216 |
| 2020/0322183 | A1* | 10/2020 | Lin | ...................... | H04L 45/245 |
| 2021/0144086 | A1* | 5/2021 | Bidgoli | .................. | H04L 45/42 |
| 2022/0166705 | A1* | 5/2022 | Froese | ............... | G06F 13/1642 |
| 2024/0056385 | A1* | 2/2024 | Bataineh | ................ | H04L 47/76 |

OTHER PUBLICATIONS

Rabadan et al., "EVPN Anycast Aliasing For Multi-Homing draft-rabnag-bess-evpn-anycast-aliasing-00", BESS Workgroup Internet-Draft, Jul. 10, 2023, 25 pgs.

* cited by examiner

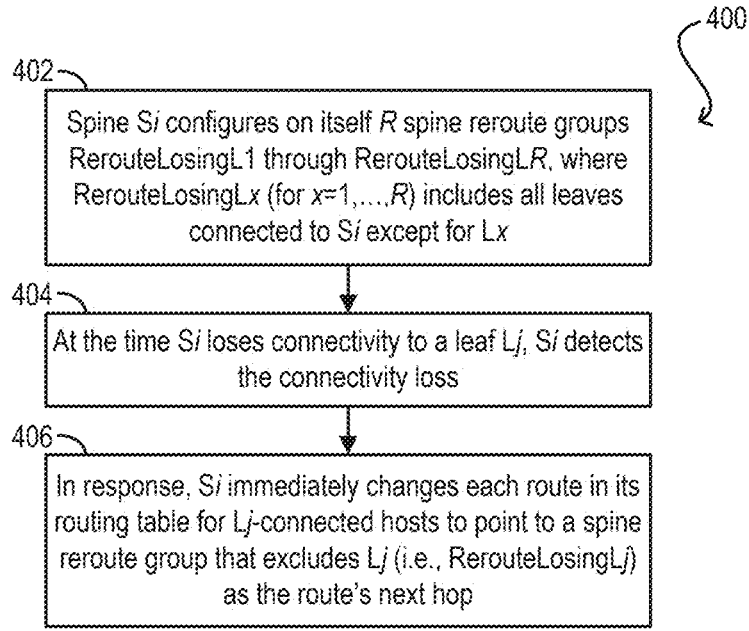

402 — Spine *Si* configures on itself *R* spine reroute groups RerouteLosingL1 through RerouteLosingL*R*, where RerouteLosingL*x* (for *x*=1,...,*R*) includes all leaves connected to *Si* except for L*x*

404 — At the time *Si* loses connectivity to a leaf L*j*, *Si* detects the connectivity loss 406 — In response, *Si* immediately changes each route in its routing table for L*j*-connected hosts to point to a spine reroute group that excludes L*j* (i.e., RerouteLosingL*j*) as the route's next hop

FIG. 4

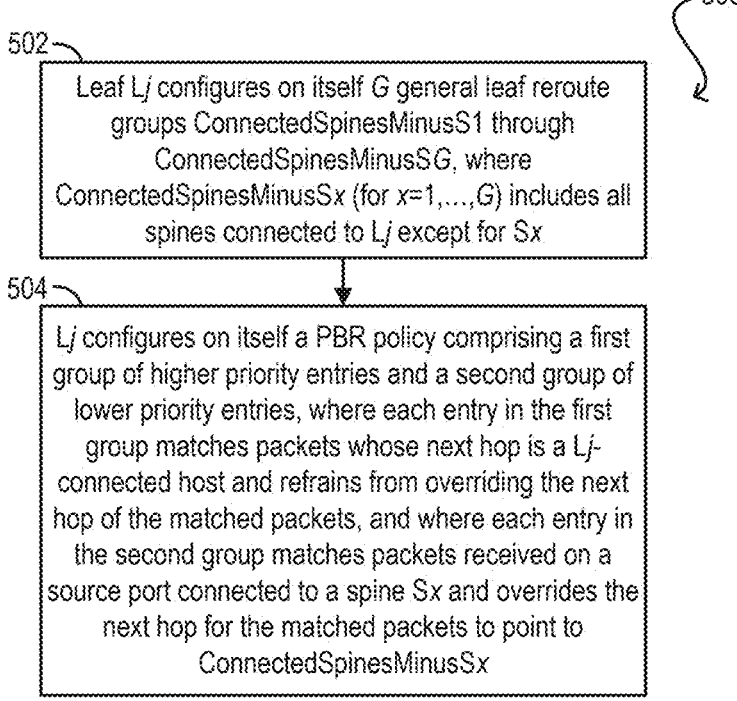

502 — Leaf L*j* configures on itself *G* general leaf reroute groups ConnectedSpinesMinusS1 through ConnectedSpinesMinusS*G*, where ConnectedSpinesMinusS*x* (for *x*=1,...,*G*) includes all spines connected to L*j* except for S*x*

504 — L*j* configures on itself a PBR policy comprising a first group of higher priority entries and a second group of lower priority entries, where each entry in the first group matches packets whose next hop is a L*j*-connected host and refrains from overriding the next hop of the matched packets, and where each entry in the second group matches packets received on a source port connected to a spine S*x* and overrides the next hop for the matched packets to point to ConnectedSpinesMinusS*x*

FIG. 5

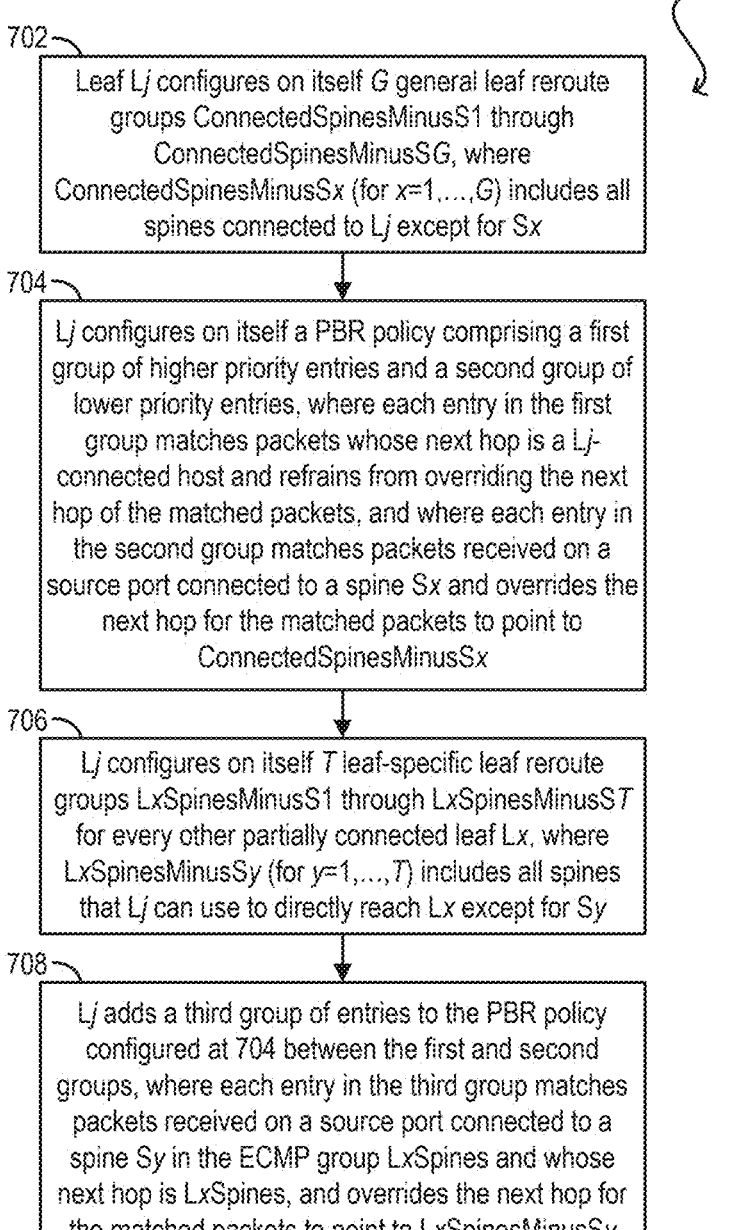

702

Leaf L*j* configures on itself *G* general leaf reroute groups ConnectedSpinesMinusS1 through ConnectedSpinesMinusS*G*, where ConnectedSpinesMinusS*x* (for *x*=1,...,*G*) includes all spines connected to L*j* except for S*x*

704

L*j* configures on itself a PBR policy comprising a first group of higher priority entries and a second group of lower priority entries, where each entry in the first group matches packets whose next hop is a L*j*-connected host and refrains from overriding the next hop of the matched packets, and where each entry in the second group matches packets received on a source port connected to a spine S*x* and overrides the next hop for the matched packets to point to ConnectedSpinesMinusS*x*

706

L*j* configures on itself *T* leaf-specific leaf reroute groups LxSpinesMinusS1 through LxSpinesMinusS*T* for every other partially connected leaf L*x*, where LxSpinesMinusS*y* (for *y*=1,...,*T*) includes all spines that L*j* can use to directly reach L*x* except for S*y*

708

L*j* adds a third group of entries to the PBR policy configured at 704 between the first and second groups, where each entry in the third group matches packets received on a source port connected to a spine S*y* in the ECMP group LxSpines and whose next hop is LxSpines, and overrides the next hop for the matched packets to point to LxSpinesMinusS*y*

FIG. 7

QUICK REROUTE IN CLOS NETWORKS

BACKGROUND

A Clos network is a computer network comprising multiple levels, or layers, of network devices. Modern data centers commonly employ a type of Clos network known as a leaf-spine network, which includes a leaf layer and a spine layer. The leaf layer is composed of leaf network devices (hereinafter simply "leaves") that connect to downstream host devices and other endpoints. The spine layer is composed of spine network devices (hereinafter simply "spines") that interconnect the leaves, thereby ensuring that any two leaves can communicate with each other through a spine.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting description. In the accompanying drawings:

FIG. 4 depicts a workflow for implementing the quick reroute feature at the spine layer according to certain embodiments.

FIG. 5 depicts a first workflow for implementing the quick reroute feature at the leaf layer according to certain embodiments.

FIG. 7 depicts a second workflow for implementing the quick reroute feature at the leaf layer according to certain embodiments.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

1. Example Leaf-Spine Network

Figure 1:
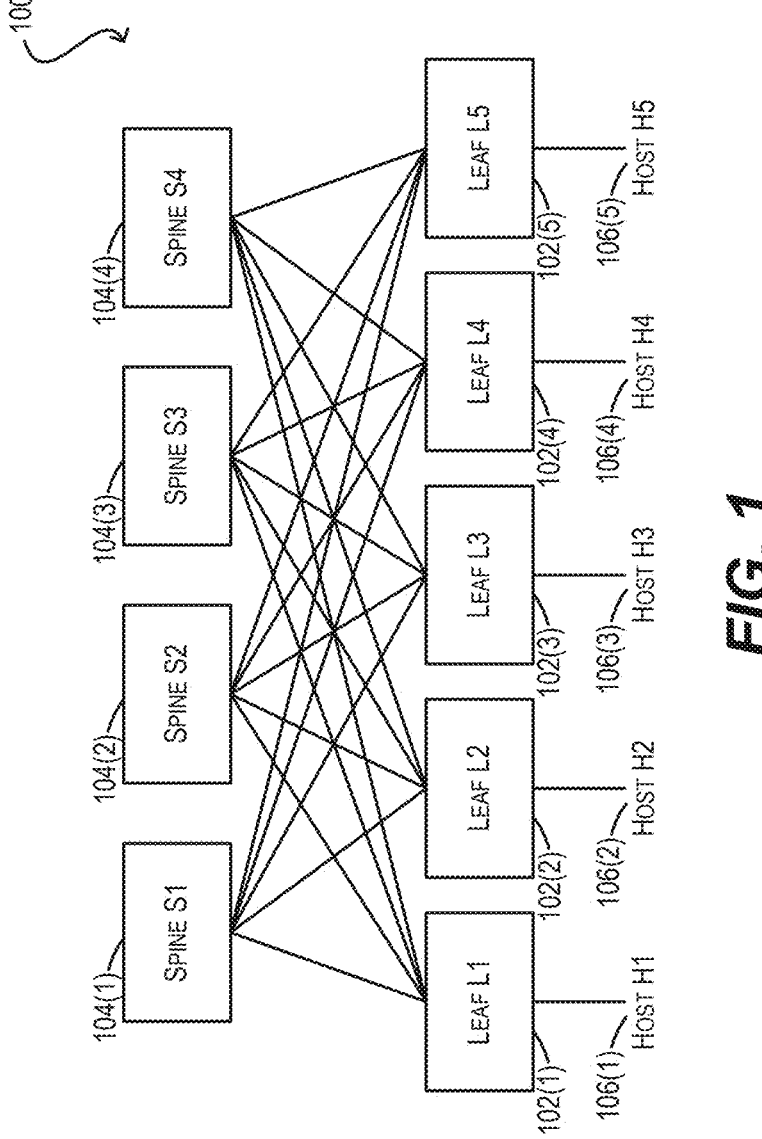
FIG. 1 depicts an example leaf-spine network according to certain embodiments.

Embodiments of the present disclosure are directed to techniques for quickly rerouting network traffic in a Clos network (and more specifically, a leaf-spine network) in scenarios where connectivity between devices at different layers in the network, such as between a leaf and a spine, is lost. FIG. 1 depicts an example leaf-spine network 100 in which these techniques may be implemented.

As shown, leaf-spine network 100 comprises five leaves L1-L5 (reference numerals 102(1)-(5)) and four spines S1-S4 (reference numerals 104(1)-(4)), each of which is a network device such as a switch or a router. For example, in the scenario where leaf-spine network 100 is deployed in a data center, leaves L1-L5 may be top-of-rack (TOR) switches and spines S1-S4 may be core/aggregation switches. The leaves and spines are fully connected, which means that each leaf is directly connected to each spine via at least one link. Further, leaves L1-L5 are connected to downstream host devices (i.e., hosts) H1-H5 (reference numerals 106(1)-(5)) respectively.

To enable load balancing of network traffic between hosts H1-H5 within leaf-spine network 100, each leaf has configured thereon an Equal-Cost Multi-Path (ECMP) group referred to herein as "ConnectedSpines." This ConnectedSpines ECMP group includes as group members all of the spines to which the leaf is directly connected (i.e., spines L1-L4) and is typically set as the next hop for routes to hosts connected to other leaves. For example, assume host H1 (which is connected to leaf L1) sends out a packet that is destined for host H5 (which is connected to leaf L5). In this case, the packet will be received by leaf L1, which will determine that the packet's next hop is its ConnectedSpines ECMP group. Leaf L1 will then perform ECMP forwarding of the packet by (1) computing a hash on fields in the packet header, (2) selecting, based on the hash, one of the group members of the ConnectedSpines ECMP group (i.e., spine S1, S2, S3, or S4), (3) and sending out the packet to the selected spine. The selected spine will subsequently forward the packet to leaf L5, which will in turn forward the packet to its destination (i.e., host H5).

Figure 2:
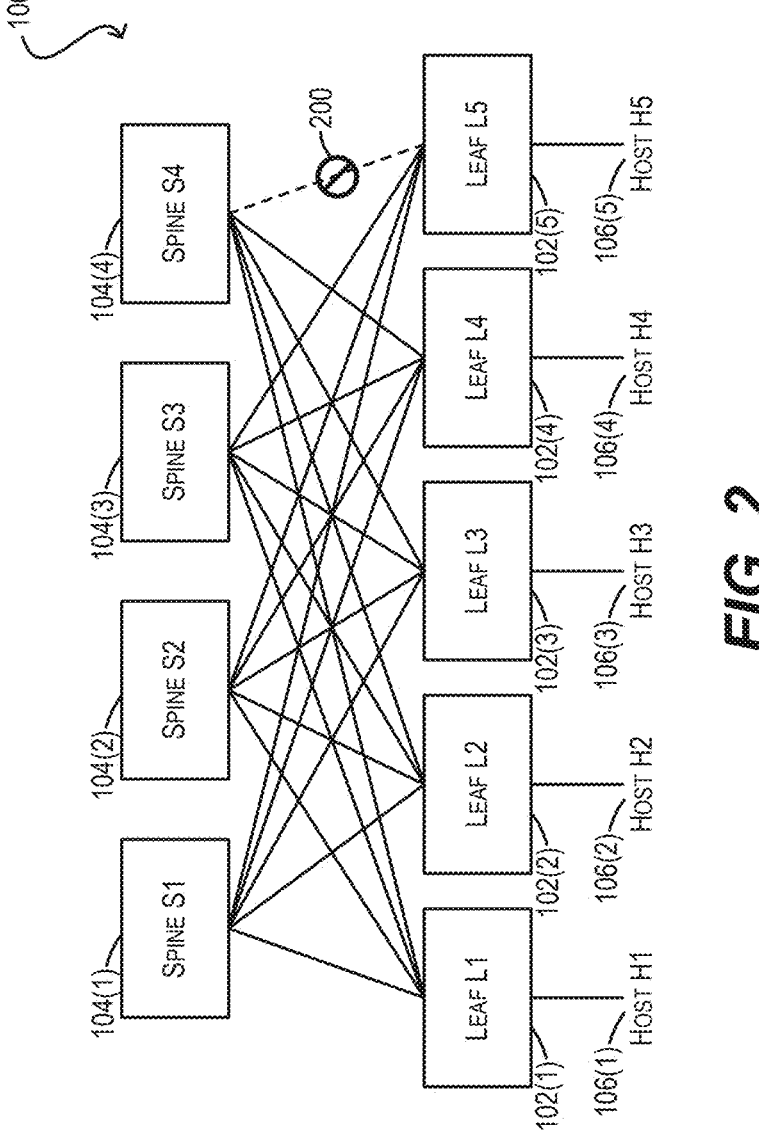
FIG. 2 depicts a link failure scenario in the leaf-spine network of FIG. 1 according to certain embodiments.

One problem that can occur in leaf-spine network 100 pertains to the scenario depicted in FIG. 2 where a spine (S4 in this example) loses direct connectivity to a leaf (L5 in this example) due to a link failure 200 between the two devices. When this connectivity loss occurs, leaf L5 will detect it and update its ConnectedSpines ECMP group (as well as any other ECMP groups configured on L5 that include spine S4) to exclude S4. In addition, spine S4 will detect the connectivity loss and initiate a conventional routing protocol-based rerouting mechanism that involves informing, via a routing protocol message, the other leaves L1-L4 that leaf L5 is no longer reachable through S4. Upon receiving the routing protocol message, leaves L1-L4 will update their respective routing tables so that the next hop for packets destined for hosts connected to leaf L5 (i.e., L5-connected hosts) is changed to a new ECMP group that excludes spine S4 (referred to herein as "L5Spines"), thereby preventing such packets from being forwarded to S4.

The issue here is that the process of updating the routing tables on leaves L1-L4 may take a significant amount of time (e.g., tens of seconds) to complete; during this time period, any packets destined for L5-connected hosts that are sent by the leaves to spine S4 will be dropped at S4 because S4 cannot forward them onward to leaf L5. This extended period of dropping (or in other words, blackholing) traffic destined for L5-connected hosts is undesirable as it can lead to service disruptions, degraded performance, and other cascading effects.

2. Solution Overview

To address the foregoing and other similar problems, embodiments of the present disclosure provide techniques that enable a Clos network—and more particularly, a leaf-spine network comprising N leaves L1-LN and M spines S1-SM—to quickly reroute network traffic that is destined for hosts connected to a leaf Lj in the case where a spine Si loses connectivity to Lj. At a high level, these techniques (collectively referred to herein as "quick reroute") involve (1) detecting, by spine Si, that its connectivity to leaf Lj has been lost, (2) upon detecting the connectivity loss, rerouting, by Si, packets destined for Lj-connected hosts to a leaf, and (3) upon receiving a rerouted packets from Si, rerouting, by that leaf, the packets to another spine Sk that is different from Si and has connectivity to Lj, thereby enabling the packets to reach Lj (and thus, reach their intended destination hosts).

Figure 3:
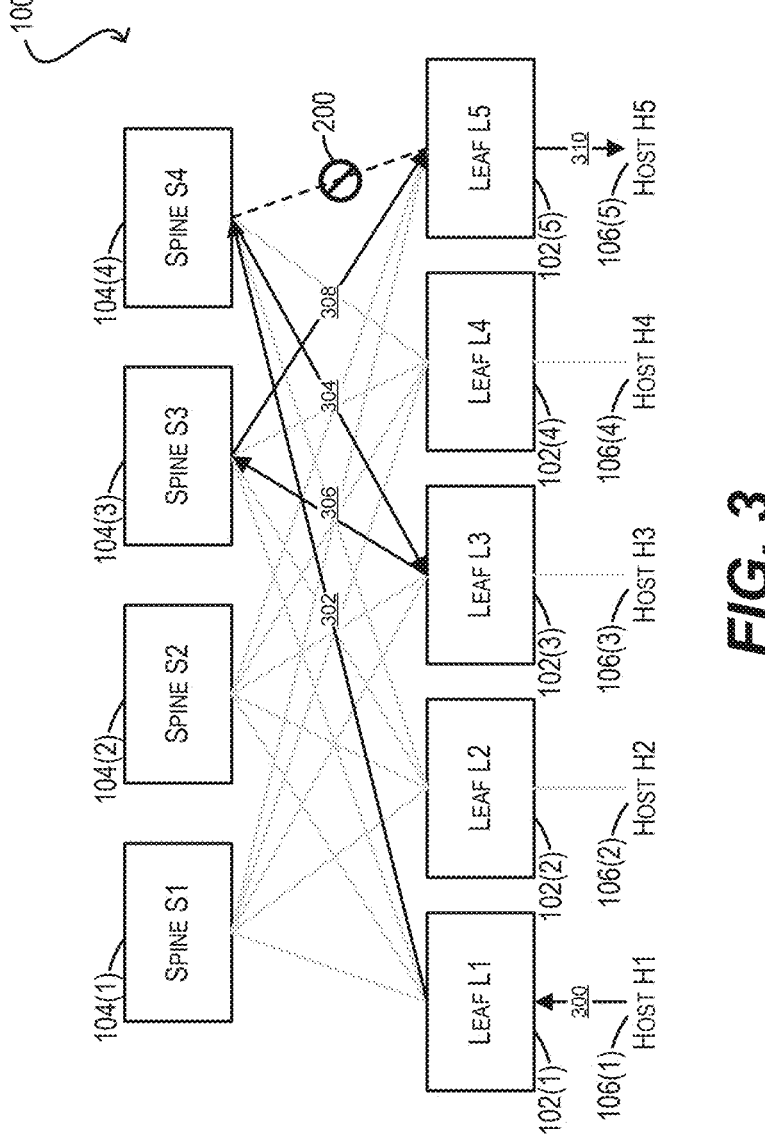
FIG. 3 depicts operation of the quick reroute feature of the present disclosure in the failure scenario of FIG. 2 according to certain embodiments.

For example, FIG. 3 depicts the operation of the quick reroute feature in the scenario where spine S4 of leaf-spine network 100 loses connectivity to leaf L5 (per the failure scenario of FIG. 2) and host H1 sends a network flow destined for host H5 through leaf L1 and spine S4 (reference numerals 300 and 302). Note that the links in leaf-spine network 100 that are not used for quick reroute in this scenario are grayed-out for legibility purposes. As shown in FIG. 3, quick reroute causes the flow to be rerouted from spine S4 to another leaf L3 (reference numeral 304), and then rerouted again from L3 to another spine S3 (reference numeral 306). Finally, spine S3 forwards the flow to leaf L5 for delivery to host H5 (reference numerals 308 and 310). This advantageously reduces the time window during which the network flow is blackholed at spine S4 from potentially tens of seconds to a few milliseconds or less (which is the time needed for S4 to detect the connectivity loss to leaf L5 and initiate the quick reroute).

The remaining sections of the present disclosure describe the processing that may be performed at each leaf and spine of a leaf-spine network like network 100 for implementing the quick reroute feature according to certain embodiments, as well as a number of enhancements, optimizations, and modifications for this feature. It should be appreciated that FIGS. 1-3 are illustrative and not intended to be limiting. For instance, although network 100 of FIGS. 1-3 comprises exactly two layers (i.e., a leaf layer and a spine layer), the quick reroute techniques of the present disclosure may also be applied to Clos networks comprising more than two layers (e.g., a leaf layer, a spine layer, and a super-spine layer). This and other aspects are discussed in further detail below.

3. Spine Reroute

FIG. 4 depicts a workflow 400 that may be performed by each spine Si (for i=1, . . . , M) of a leaf-spine network comprising M spines S1-SM and N leaves L1-LN for implementing quick reroute at the spine layer (referred to as the "spine reroute" process) according to certain embodiments. Workflow 400 may be embodied in software, hardware, or a combination thereof. In the case of software, workflow 400 may be embodied in program code that is stored on a non-transitory computer readable medium (e.g., storage or memory) and is executable by one or more general-purpose processors (e.g., central processing units (CPUs)) of the spine.

Starting with step 402, spine Si can configure on itself a number of new ECMP groups, called spine reroute groups, where each spine reroute group is designed to handle a scenario in which connectivity between Si and a particular leaf in the leaf-spine network is lost. Spine Si can configure these spine reroute groups at the time of its bootup/initialization, as well as on a dynamic basis during runtime as the spine's connectivity to the leaves change.

In one set of embodiments, spine Si can configure R spine reroute groups at step 402, referred to herein as "RerouteLosingL1" through "RerouteLosingLR," where R corresponds to the number of leaves that are currently connected to Si (which will typically be N). In these embodiments, each spine reroute group RerouteLosingLx (for x=1, . . . , R) is designed to handle a scenario where connectivity between spine Si and leaf Lx is lost and thus includes all connected leaves except for Lx. By way of example, the following table presents the spine reroute groups that can be configured on each spine S1-S4 of leaf-spine network 100 of FIG. 1 using this approach:

TABLE 1

| ECMP group | Number of members | Members |
|---|---|---|
| RerouteLosingL1 | 4 | L2, L3, L4, L5 |
| RerouteLosingL2 | 4 | L1, L3, L4, L5 |
| RerouteLosingL3 | 4 | L1, L2, L4, L5 |
| RerouteLosingL4 | 4 | L1, L2, L3, L5 |
| RerouteLosingL5 | 4 | L1, L2, L3, L4 |

Alternatively, spine Si can configure R' spine reroute groups at step 402, where R'<R and where each spine reroute group is designed to handle a scenario in which connectivity between Si and any one of multiple leaves is lost. The advantage to this approach is that it reduces the number of spine reroute groups created (and thus saves ECMP table space); however, the downside is that rerouted traffic will not be as evenly distributed across the reachable leaves of spine Si. By way of example, the following table presents two spine reroute groups that can be configured on each spine S1-S4 of leaf-spine network 100 of FIG. 1 using this alternative approach:

TABLE 2

| ECMP group | Number of members | Members |
|---|---|---|
| RerouteLosingL1L2 | 3 | L3, L4, L5 |
| RerouteLosingL3L4L5 | 2 | L1, L2 |

With the spine reroute groups in place, at the time spine Si loses connectivity to a leaf Lj, Si can detect the connectivity loss (step 404) and, in response, can immediately change each route in its routing table for hosts connected to Lj (i.e., Lj-connected hosts) to point to a spine reroute group that excludes Lj (i.e., RerouteLosingLj) as the route's next hop (step 406). This can be achieved by changing each route in a sequential fashion or by using a mechanism such as protection next-hop (which allows the spine to update all of the routes in parallel using a single command).

Although not shown in FIG. 4, once these route updates are complete, the data plane (e.g., packet processor) of spine Si will thereafter send received packets that are destined for Lj-connected hosts to RerouteLosingLj, thereby rerouting the packets to one of the members of that ECMP group (which will be a leaf other than Lj) via ECMP forwarding. In certain embodiments, if spine Si already has a number of packets queued for transmission to Lj at this point, the data plane can recycle the packets (or in other words, cause the packets to re-enter the data plane's packet processing pipeline), which will allow the packets to be routed in accordance with the updated routes to RerouteLosingLj.

4. Leaf Reroute

In various embodiments, the manner in which quick reroute is implemented at each leaf in the leaf layer (referred to as the "leaf reroute" process) depends on when other leaves in the leaf-spine network have full connectivity to the spines or not. If the answer to this question is yes, one approach should be used; if the answer to this question is no, another approach should be used. Each of these approaches is described in turn below.

4.1 Every Other Leaf has Full Connectivity

FIG. 5 depicts a workflow 500 that may be performed each leaf Lj (for j=1, . . . , N) in a leaf-spine network comprising M spines S1-SM and N leaves L1-LN for implementing leaf reroute in the case where every other leaf has full connectivity to spines S1-SM (which means that every other leaf can directly reach every spine). Workflow 500 may be embodied in software, hardware, or a combination thereof. In the case of software, workflow 500 may be embodied in program code that is stored on a non-transitory computer readable medium (e.g., storage or memory) and is executable by one or more general-purpose processors (e.g., central processing units (CPUs)) of the leaf.

Starting with step 502, leaf Lj can configure on itself a number of new ECMP groups, called general leaf reroute groups, where each general leaf reroute group is designed to handle a scenario where Lj has received a rerouted packet from a particular spine via the spine reroute process mentioned above. Leaf Lj can configure these general leaf reroute groups at the time of its bootup/initialization, as well as on a dynamic basis during runtime as the leaf's connectivity to the spines change.

More specifically, leaf Lj can configure G general leaf reroute groups at step 502, referred to herein as "ConnectedSpinesMinusS1" through "ConnectedSpinesMinusSG," where G corresponds to the number of spines that are currently connected to Lj (which will typically be M). Each general leaf reroute group ConnectedSpinesMinusSx (for x=1, . . . , G) is designed to handle a scenario where connectivity between leaf Lj receives a rerouted packet from Spine Sx and thus includes all connected spines except for Sx (so that the leaf does the reroute the packet back again to Sx). By way of example, the following table presents the general leaf reroute groups that can be configured on each leaf L1-L5 of leaf-spine network 100 of FIG. 1:

TABLE 3

| ECMP group | Number of members | Members |
|---|---|---|
| ConnectedSpinesMinusS1 | 3 | S2, S3, S4 |
| ConnectedSpinesMinusS2 | 3 | S1, S3, S4 |
| ConnectedSpinesMinusS3 | 3 | S1, S2, S4 |
| ConnectedSpinesMinusS4 | 3 | S1, S2, S3 |

At step 504, leaf Lj can further configure on itself a policy-based routing (PBR) policy, where each entry in the PBR policy matches incoming packets on a combination of source port (i.e., the port of Lj on which the packet is received) and next hop and, based on these match criteria, potentially overrides the next hop to point to one of the general leaf reroute groups configured at step 502 (if the packet is a rerouted packet). In one set of embodiments, the PBR policy can include a first group of higher priority entries and a second group of lower priority entries. The first group of higher priority entries are configured to (1) match packets whose next hop is a host that is connected to (i.e., downstream of) leaf Lj and (2) refrain from performing a next hop override of the matched packets. Accordingly, this first group of entries ensure that any incoming packets that are destined for hosts directed connected to leaf Lj are not rerouted back to the spine layer.

The second group of lower priority entries are configured to (1) match packets received on a source port connected to a spine Sx (for x=1, . . . , G) and (2) override the next hop for the matched packets to point to ConnectedSpinesMinusSx. Accordingly, this second group of entries ensure that an incoming packet which has been sent to leaf Lj as a result of a spine reroute at the spine layer is rerouted back to a different (connected) spine. Note that the second group of entries are lower in priority than the first group of entries in the PBR policy to prevent packets that are destined for Lj-connected hosts (which are directly reachable by leaf Lj) from being rerouted to the spine layer.

By way of example, the following table presents a sample PBR policy that can be configured on leaf L2 of leaf-spine network 100 of FIG. 1. In this sample policy, the symbol "*" is a wildcard indicating "any." Further, the first row corresponds to the first group of higher priority entries mentioned above and the second through fifth rows correspond to the second group of lower priority entries mentioned above.

TABLE 4

| Source port | Next hop | Override next hop? | Overridden next hop | Send copy to CPU? |
|---|---|---|---|---|
| * | Host H2 | No | — | No |
| Port to S1 | * | Yes | ConnectedSpinesMinusS1 | Yes |
| Port to S2 | * | Yes | ConnectedSpinesMinusS2 | Yes |
| Port to S3 | * | Yes | ConnectedSpinesMinusS3 | Yes |
| Port to S4 | * | Yes | ConnectedSpinesMinusS4 | Yes |

Although not shown in FIG. 5, once the general leaf reroute groups and the PBR policy are in place, the data plane (e.g., packet processor) of leaf Lj will thereafter send packets that are rerouted to Lj from a spine Sx to ConnectedSpinesMinusSx, thereby rerouting the packets to one of the members of that ECMP group (which will be a connected spine other than Sx) via ECMP forwarding.

As indicated in Table 4 above, in some embodiments the second group of lower priority PBR policy entries (which match rerouted packets from a spine) can also copy matched packets to leaf Lj's CPU. This feature, known as CPU snooping, allows software running on the CPU to determine which spine-leaf connectivity failure caused the spine-level rerouting to occur and immediately update its routes for hosts connected to the affected leaf to use a new ECMP group that excludes the affected spine (rather than waiting for the conventional routing protocol-based mechanism to effect this change). For example, if the software determines that the copied packets were rerouted at the spine layer due to a connectivity loss between spine S4 and leaf L5 (which means the packets are destined for L5-connected hosts), the software can update its routes for L5-connected hosts to use the ECMP group L5Spines (which excludes spine S4). This prevents leaf Lj from sending packets destined for L5-connected hosts to spine S4, thereby bypassing the need to perform quick reroute on those packets before its routing table is updated via the conventional routing protocol-based mechanism.

4.2 One or More Other Leaves do not have Full Connectivity

Figure 6:
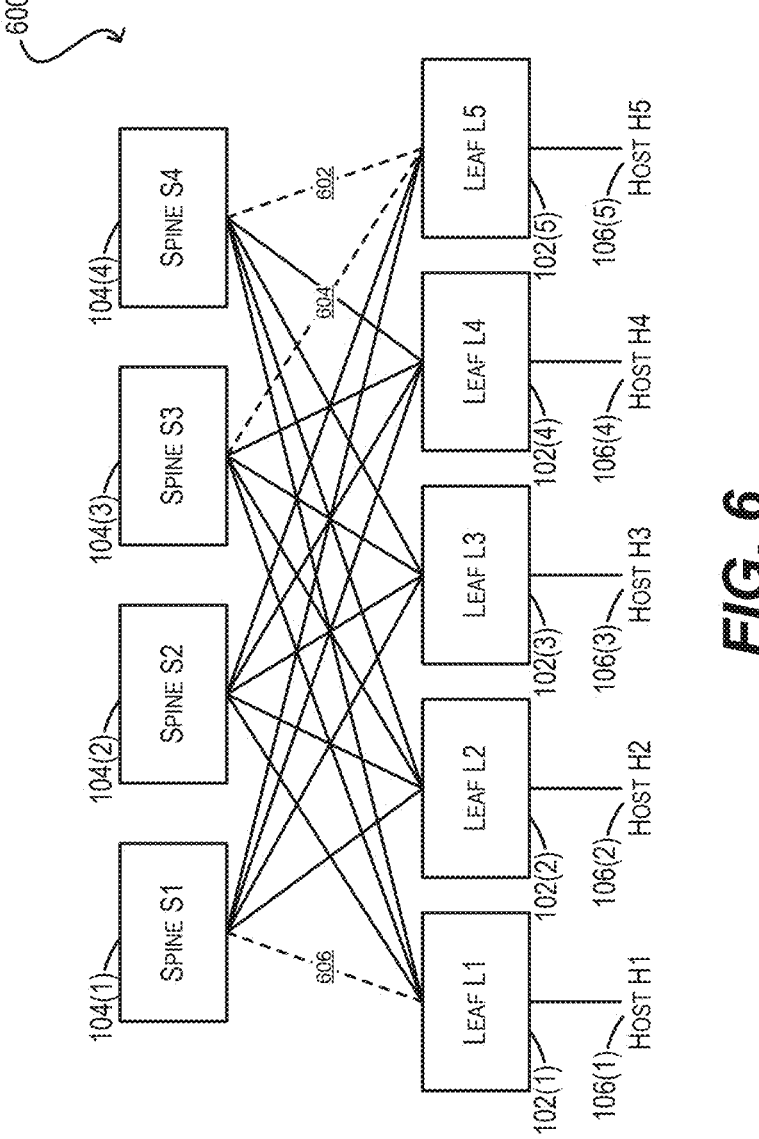
FIG. 6 depicts a version of the leaf-spine network of FIG. 1 where some leaves are not fully connected according to certain embodiments.

In some cases, leaf Lj may determine that one or more other leaves in the leaf-spine network do not have full connectivity to spines S1-SM (referred to as "partially connected leaves"). This may occur due to, e.g., prior connectivity failures in the network that have not been repaired. For example, FIG. 6 depicts a version 600 of leaf-spine network 100 of FIG. 1 where link 602 between spine S4 and leaf L5, link 604 between spine S3 and leaf L5, and link 606 between spine S1 and leaf L1 are no longer operational, which means that leaves L1 and L5 are partially connected.

In these cases, leaf Lj will have configured thereon an ECMP group LxSpines for each partially connected leaf Lx that excludes the spines that do not have connectivity to Lx (as well as spines that Lj does not have direct connectivity to) and each LxSpines group will be set as the next hop for routes on Lj that are destined for Lx-connected hosts, per the operation of the conventional routing protocol-based mechanism mentioned earlier. For example, in leaf-spine network 600 of FIG. 6, leaf L1 will have configured thereon a L5Spines group that solely includes spine S2 and is set as the next hop for routes leading to L5-connected hosts; leaves L2-L4 will have configured thereon a L5Spines group that solely includes spines S1 and S2 and is set as the next hop for routes leading to L5-connected hosts; and leaf L5 will have configured thereon a L1Spines group that solely includes spine S2 and is set as the next hop of routes leading to L1-connected hosts.

With the foregoing in mind, FIG. 7 depicts a workflow 700 that can be performed by leaf Lj for implementing leaf reroute in the case where one or more other leaves do not have full connectivity to spines S1-SM. Workflow 700 may be embodied in software, hardware, or a combination thereof. In the case of software, workflow 700 may be embodied in program code that is stored on a non-transitory computer readable medium (e.g., storage or memory) and is executable by one or more general-purpose processors (e.g., central processing units (CPUs)) of the leaf.

Starting with steps 702 and 704, leaf Lj can configure on itself G general leaf reroute groups and a PBR policy based on those general leaf reroute groups in a manner identical to steps 502 and 504 of workflow 500.

At step 706, leaf Lj can further configure on itself a set of T leaf-specific leaf reroute groups for every other partially connected leaf Lx in the network, referred to herein as "LxSpinesMinusS1" through "LxSpinesMinusST," where T corresponds to the number of spines that leaf Lj can use to directly reach Lx. Each leaf-specific leaf reroute group LxSpinesMinusSy (for y=1, . . . , T) is designed to handle a scenario where leaf Lj receives a rerouted packet from spine Sy that is destined for an Lx-connected host and thus includes all spines that can be used to directly reach Lx except for Sy (so that Lj does not reroute the packet back again to Sy). If T=1 (which means which means there is only a single direct path from leaf Lj to partially connected leaf Lx), Lj can refrain from configuring a leaf-specific leaf reroute group for Lx.

By way of example, the following table presents the leaf-specific leaf reroute groups that can be configured on each leaf L2-L4 of leaf-spine network 600 of FIG. 6 in accordance with the foregoing. No leaf-specific leaf re-route groups are configured on leaf L5 or leaf L1 of network 600 because L5 only has a single direct path (through spine S2) to partially connected leaf L1 and similarly L1 only has a single direct path (through S2) to partially connected leaf L5.

TABLE 5

| ECMP group | Number of members | Members |
|---|---|---|
| L5SpinesMinusS1 | 1 | S2 |
| L5SpinesMinusS2 | 1 | S1 |
| L1SpinesMinusS2 | 2 | S3, S4 |
| L1SpinesMinusS3 | 2 | S2, S4 |
| L1SpinesMinusS4 | 2 | S2, S3 |

Finally, at step 708, leaf Lj can add a third group of entries to the PBR policy configured at step 704 that are located between the first group of higher priority entries and the second group of lower priority entries mentioned previously, where each entry in this third group is configured to, for a partially connected leaf Lx, (1) match packets received on a source port connected to a spine Sy in the ECMP group LxSpines and whose next hop is LxSpines, and (2) override the next hop for the matched packets to point to LxSpinesMinusSy. Accordingly, this third group of entries ensures than an incoming packet that is destined for an Lx-connected host and has been rerouted from a spine Sy is rerouted back to a different spine that can reach Lx.

By way of example, the following table presents a version of the PBR policy of Table 4 (for leaf L2 of network 600) that has been modified in accordance with step 708 of workflow 700. This modified policy includes the third set of entries explained above (shown in bold) for partially connected leaves L5 and L1.

TABLE 6

| Source port | Next hop | Override next hop? | Overridden next hop | Send copy to CPU? |
|---|---|---|---|---|
| * | Host H2 | No | — | No |
| Port to S1 | L5Spines | Yes | L5SpinesMinusS1 | Yes |
| Port to S2 | L5Spines | Yes | L5SpinesMinusS2 | Yes |
| Port to S2 | L1Spines | Yes | L1SpinesMinusS2 | Yes |
| Port to S3 | L1Spines | Yes | L1SpinesMinusS3 | Yes |
| Port to S4 | L1Spines | Yes | L1SpinesMinusS4 | Yes |
| Port to S1 | * | Yes | ConnectedSpinesMinusS1 | Yes |
| Port to S2 | * | Yes | ConnectedSpinesMinusS2 | Yes |
| Port to S3 | * | Yes | ConnectedSpinesMinusS3 | Yes |
| Port to S4 | * | Yes | ConnectedSpinesMinusS4 | Yes |

Like the second group of lower priority entries that override the next hop to a general leaf reroute group, the third group of entries added at step 708 that override the next hop to a leaf-specific leaf reroute group can also copy matched packets to leaf Lj's CPU. This allows software running on the CPU to determine which spine-leaf connectivity failure caused the spine-level rerouting to occur and immediately update its routes for hosts connected to the affected leaf to use a new/revised ECMP group that excludes the affected spine (rather than waiting for the conventional routing protocol-based mechanism to effect this change). For example, in the context of FIG. 6, if the software determines that the copied packets were rerouted at the spine layer due to a connectivity loss between S2 and L3, the software can update its routes for L3-connected hosts to use the ECMP group L3Spines (which excludes spine S2). This prevents leaf Lj from sending packets destined for L3-connected hosts to spine S2, thereby bypassing the need to perform quick reroute on those packets before its routing table is updated via the conventional routing protocol-based mechanism.

5. Handling Complete Connectivity Loss to a Leaf

In certain scenarios, all of the links between a leaf Lj and spines S1-SM can go down, which makes Lj completely unreachable. With the quick reroute feature active, any packet that is destined for Lj-connected hosts in such a scenario will be rerouted back and forth between the spine and leaf layers until the time-to-live (TTL) value for the packet reaches zero (at which point the packet will be dropped). This behavior is undesirable because it consumes network bandwidth for no benefit.

To address this, in one set of embodiments the TTL value for packets that traverse through the leaf-spine network can be set to a value that is low enough to allow only one quick reroute cycle (i.e., a reroute from a spine to a leaf and then back to an alternative spine). For example, if a connectivity failure occurs between spine Si and leaf Lj, the TTL value can be set such that any packets destined for Lj-connected hosts are dropped if they do not reach Lj after being rerouted from Si to a single alternative spine Sk.

In a further set of embodiments, as part of the CPU snooping performed by each leaf on rerouted packets, the leaf can determine that leaf Lj has lost connectivity to all spines and in response can program its data plane to drop all packets destined for Lj-connected hosts. This optimization prevents such packets from being rerouted at all, because they will ultimately be dropped anyway once their TTL value reaches zero.

6. Multiple Links Between a Spine and a Leaf

If there are multiple links between a spine Si and a leaf Lj and only a subset of these links goes down, there is no need to carry out quick reroute on packets that are received at Si and are destined for Lj-connected hosts because connectivity between Si and Lj is not lost; Sj can still reach Lj via the remaining operable link(s). However, if the links are heavily loaded and a significant percentage of the links become inoperable (e.g., 50% or more), it may be helpful to reroute a portion of the traffic that would have traversed the inoperable links, as this will reduce the load on the operable link(s). In these cases, the CPU snooping feature mentioned earlier (which causes a leaf to preemptively redirect packets away from a spine that sends it rerouted packets) can be disabled, which will allow spine Si to receive traffic destined for Lj-connected hosts and forward it onward to Lj (via one of the operable links) or reroute it as desired.

7. Clos Network with More than Two Layers

Figure 8:
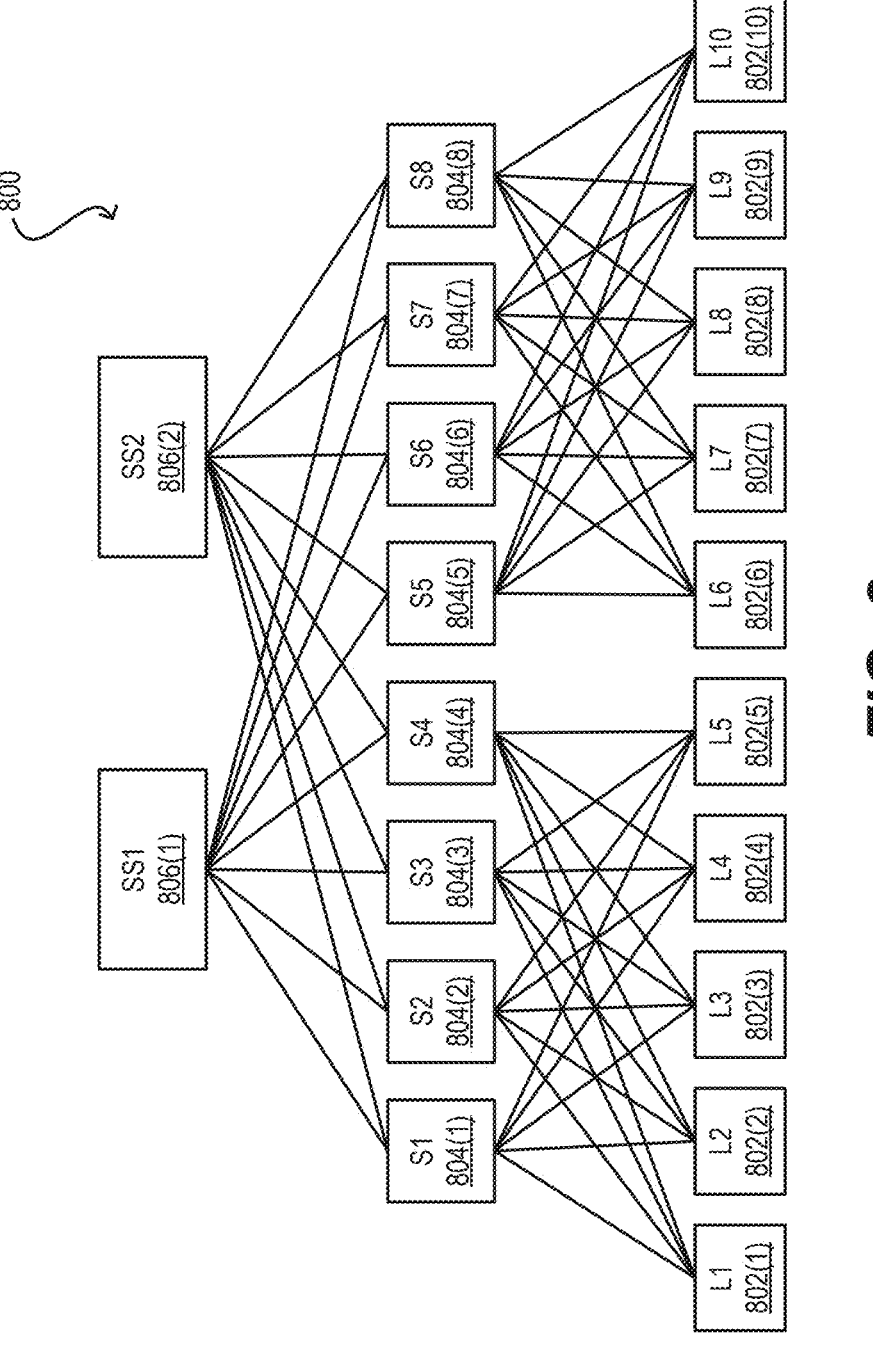
FIG. 8 depicts an example Clos network comprising three layers according to certain embodiments.

Although the foregoing description focuses on a Clos network with two layers (i.e., a leaf-spine network with a leaf layer and a single spine layer), the quick reroute feature can also be implemented on Clos network with more than two layers (i.e., a leaf-spine network with a leaf layer, a spine layer, and one or more super-spine layers). For example, FIG. 8 depicts a 3-layer Clos network 800 with a leaf layer comprising leaves L1-L10 (reference numerals 802(1)-(10)), a spine layer comprising spines S1-S8 (reference numerals 804(1)-(8)) that interconnect L1-L10, and a super-spine layer comprising super-spines SS1 and SS2 (reference numerals 806 (1)-(2)) that interconnect S1-S8.

In network 800, if a connectivity failure occurs between a spine Si and a leaf Lj, the quick reroute feature can be used to reroute traffic destined for Lj-connected hosts in a "downward" direction via the leaf layer or in an "upward" direction via the super-spine layer (although oversubscription typically increases at higher layers so it is generally beneficial re-route downwards to the leaf layer). The process of rerouting downwards is identical to what is described in the preceding sections: specifically, spine Si can reroute packets destined for Lj-connected hosts to a leaf, which in turn can reroute the packets to a different spine Sk that has connectivity to Lj. Spine Sk can then forward the packets to leaf Lj so that they can reach their destinations.

The process of rerouting upwards is similar: spine Si can reroute packets destined for Lj-connected hosts to a super-spine (i.e., SS1 or SS2), which can in turn reroute the packets to a different spine Sk that has connectivity to Lj. The main implementation differences with upward rerouting are as follows according to certain embodiments:

Each spine S1-SM only needs to have configured thereon a single spine reroute group, referred to as "Reroute-Super-spines," that includes all of the super-spines in the network. At the time a spine Si detects a loss of connectivity to a leaf Lj, Si can change all of its routes leading to Lj-connected hosts to point to RerouteSuper-spines as the next hop.

The super-spines, rather than the leaves, should be configured with the "leaf reroute groups" and associated PBR policy entries described in section 4 above. Generally speaking, every reference to "leaf" in section 4 can be replaced with "super-spine" in order to implement upward rerouting.

It should be noted that if a connectivity failure occurs between a spine and a super-spine, the quick reroute feature is not needed or applicable because such a failure does not prevent the spine from communicating with any leaves, and thus does not cause any dropped traffic. In this type of scenario, the network can adjust itself accordingly to simply avoid using the downed spine-to-super-spine link.

8. Example Network Device

Figure 9:
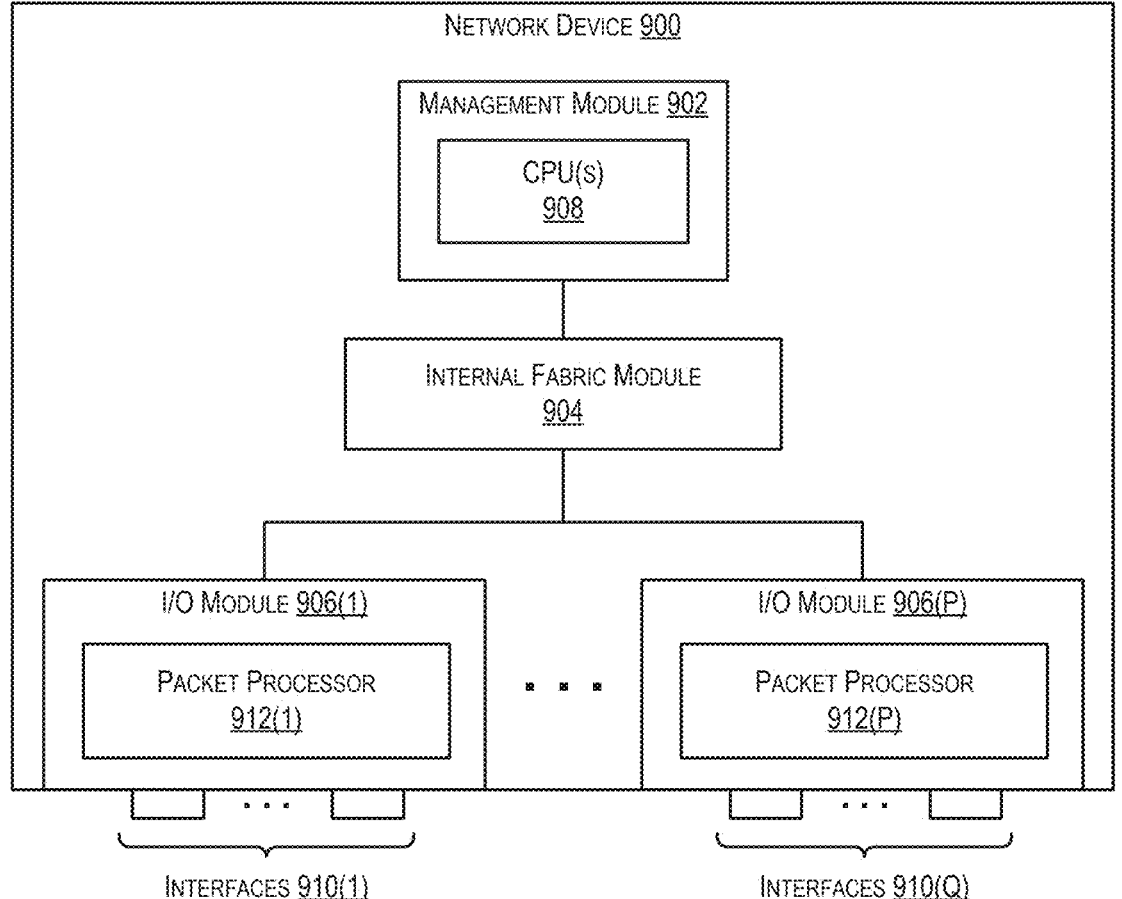
FIG. 9 depicts an example network device according to certain embodiments.

FIG. 9 is a simplified block diagram of a network device (e.g., switch or router) 900 according to certain embodiments of the present disclosure. Network device 900 may be used to implement any of the leaves and/or spines described in the foregoing sections. As shown, network device 900 comprises a management module 902, an internal fabric module 904, and a number of I/O modules 906(1)-(P). Management module 902 includes one or more CPUs 908 for managing/controlling the operation of network device 900. Each CPU 908 may be a general-purpose processor, such as an Intel/AMD x86 or ARM-based processor, that operates under the control of software stored in an associated memory (not shown). Such software may embody some or all of the techniques disclosed herein.

Internal fabric module 904 and I/O modules 906(1)-(P) collectively represent the data, or forwarding, plane of network device 900. Internal fabric module 904 is configured to interconnect the various other modules of network device 900. Each I/O module 906 includes one or more input/output interfaces (ports) 910(1)-(Q) that are used by network device 900 to send and receive network packets. Each I/O module 906(1)-(P) also includes a packet processor 912, which is a specialized processor (e.g., an application-specific integrated circuit (ASIC) or field-programmable gate array (FPGA)) that is designed to make line speed decisions on how to handle incoming or outgoing network packets. In some embodiments, packet processor 912 may implement some or all of the techniques disclosed herein.

It should be appreciated that network device 900 is illustrative and many other configurations having more or fewer components than network device 900 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method for implementing quick reroute in a Clos network comprising a leaf layer with a plurality of leaf network devices and a spine layer with a plurality of spine network devices, the method comprising:

configuring, by a first spine network device in the plurality of spine network devices, a first set of Equal-Cost Multi-Path (ECMP) groups on the first spine network device, the first set of ECMP groups including a first ECMP group that comprises the plurality of leaf network devices except for a first leaf network device;

detecting, by a first spine network device, a connectivity failure between the first spine network device and the first leaf network device; and in response to the detecting, updating, by the first spine network device, one or more routes in a routing table of the first spine network device, wherein the one or more routes are associated with one or more hosts that are connected to the first leaf network device, and wherein updating each route in the one or more routes comprises changing the route to point to the first ECMP group as a next hop.

2. The method of claim 1 wherein each ECMP group in the first set of ECMP groups comprises the plurality of leaf network devices except for a particular leaf network device in the plurality of leaf network devices.

3. The method of claim 1 wherein the particular leaf network device is a different leaf network device for said each ECMP group.

4. The method of claim 1 wherein the updating causes a network packet that is received by the first spine network device and is destined for a host in the one or more hosts to be rerouted to a second leaf network device in the plurality of leaf network devices.

5. The method of claim 4 wherein upon receiving the network packet, the second leaf network device reroutes the network packet to a second spine network device in the plurality of spine network devices that is connected to the first leaf network device.

6. The method of claim 5 wherein upon receiving the network packet, the second spine network device forwards the packet to the first leaf network device.

7. The method of claim 4 wherein the second leaf network device has configured thereon:

a second set of ECMP groups, each ECMP group in the second set of ECMP groups including the plurality of spine network devices except for a particular spine network device; and a policy-based routing (PBR) policy including a first group of higher priority entries and a second group of lower priority entries.

8. The method of claim 7 wherein each entry in the first group of higher priority entries is configured to match packets whose next hop is a host connected to the second leaf network device and to refrain from overriding the next hop of the matched packets.

9. The method of claim 7 wherein each entry in the second group of lower priority entries is configured to match packets that are received on a source port connected to a source spine network device and to override a next hop of the matched packets to point to an ECMP group in the second set of ECMP groups that excludes the source spine network device.

10. The method of claim 9 wherein said each entry in the second group of lower priority entries is further configured to copy the matched packets to a central processing unit (CPU) of the second leaf network device.

11. The method of claim 7 wherein the second leaf network device further has configured thereon a third set of ECMP groups, each ECMP group in the third set of ECMP groups including all spine network devices in the plurality of spine network devices that the second leaf network device can use to directly reach a particular leaf network device, except for a particular spine network device in said all spine network devices.

12. The method of claim 11 wherein the PBR policy further includes a third group of entries between the first group of higher priority entries and the second group of lower priority entries, each entry in the third group of entries being configured to match packets that are received on a source port connected to a source spine network device and to override a next hop of the matched packets to point to an ECMP group in the third set of ECMP groups that excludes the source spine network device.

13. The method of claim 12 wherein said each entry in the third group of entries is further configured to copy the matched packets to a CPU of the second leaf network device.

14. The method of claim 10 wherein, upon determining from the matched packets that the first leaf network device has lost connectivity to every spine network device in the plurality of spine network devices, the CPU of the second leaf network device programs a data plane of the second leaf network device to drop all packets destined for hosts connected to the first leaf network device.

15. The method of claim 1 wherein the Clos network further comprises a super-spine layer with a plurality of super-spine network devices that are connected to the plurality of spine network devices.

16. A spine network device in a Clos network comprising a plurality of spine network devices and a plurality of leaf network devices, the spine network device comprising:

one or more processors; and a computer-readable storage medium having stored thereon program code that, when executed by the one or more processors, causes the one or more processors to:

configure a set of Equal-Cost Multi-Path (ECMP) groups on the spine network device, the set of ECMP groups including an ECMP group that comprises the plurality of leaf network devices except for a first leaf network device;

detect a connectivity failure between the spine network device and the first leaf network device; and in response to the detecting, update one or more routes in a routing table of the spine network device, wherein the one or more routes are associated with one or more hosts that are connected to the first leaf network device, and wherein updating each route in the one or more routes comprises changing the route to point to the ECMP group as a next hop.

17. A method for implementing quick reroute in a Clos network comprising a leaf layer with a plurality of leaf network devices, a spine layer with a plurality of spine network devices, and a super-spine layer with a plurality of super-spine network devices, the method comprising:

configuring, by a first spine network device in the plurality of spine network devices, a first set of Equal-Cost Multi-Path (ECMP) groups on the first spine network device, the first set of ECMP groups including a first ECMP group that comprises the plurality of super-spine network devices;

detecting, by a first spine network device, a connectivity failure between the first spine network device and a first leaf network device in the plurality of leaf network devices; and in response to the detecting, updating, by the first spine network device, one or more routes in a routing table of the first spine network device, wherein the one or more routes are associated with one or more hosts that are connected to the first leaf network device, and wherein updating each route in the one or more routes comprises changing the route to point to the first ECMP group as a next hop.

18. The method of claim 17 wherein the updating causes a network packet that is received by the first spine network device and is destined for a host in the one or more hosts to be rerouted to a super-spine network device in the plurality of super-spine network devices.

19. The method of claim 18 wherein upon receiving the network packet, the super-spine network device reroutes the network packet to a second spine network device in the plurality of spine network devices that is connected to the first leaf network device.

20. The method of claim 19 wherein upon receiving the network packet, the second spine network device forwards the packet to the first leaf network device.

* * * * *